(12) United States Patent
Bach et al.

(10) Patent No.: US 6,775,330 B2
(45) Date of Patent: Aug. 10, 2004

(54) PREDISTORTED MODULATION SYSTEM FOR BANDWIDTH EFFICIENT SATELLITE LINKS

(75) Inventors: Susan E. Bach, Redondo Beach, VA (US); Andrew L. Strodtbeck, Marina del Rey, CA (US)

(73) Assignee: The Boeing Company, Chicago, IL (US)

(*) Notice: Subject to any disclaimer, the term of this patent is extended or adjusted under 35 U.S.C. 154(b) by 0 days.

(21) Appl. No.: 10/289,043

(22) Filed: Nov. 6, 2002

(65) Prior Publication Data

US 2003/0202615 A1 Oct. 30, 2003

Related U.S. Application Data

(60) Provisional application No. 60/376,214, filed on Apr. 29, 2002.

(51) Int. Cl.[7] ............................................. H04L 25/03
(52) U.S. Cl. ..................... 375/296; 375/285; 455/126
(58) Field of Search ................................. 375/296, 297, 375/285, 284; 455/126; 330/149

(56) References Cited

U.S. PATENT DOCUMENTS

| | | | | |
|---|---|---|---|---|
| 5,732,333 A | * | 3/1998 | Cox et al. | 455/126 |
| 6,141,390 A | * | 10/2000 | Cova | 375/297 |
| 6,240,278 B1 | * | 5/2001 | Midya et al. | 455/126 |
| 2003/0035494 A1 | * | 2/2003 | Bauder et al. | 375/296 |
| 2003/0207680 A1 | * | 11/2003 | Yang et al. | 455/341 |

* cited by examiner

Primary Examiner—Temesghen Ghebretinsae
(74) Attorney, Agent, or Firm—Gates & Cooper LLP

(57) ABSTRACT

The present invention discloses a predistortion modulation system for use in satellite systems. A typical apparatus of the invention includes a predistortion processor for predistorting a digital data source signal to reduce transmission distortion and an adaptive algorithm processor for controlling the predistortion processor according to a received a feedback signal derived from the transmitted data source signal. In further embodiments, the non-linear and linear predistortion is adaptively controlled. The invention is particularly useful in a digital cinema satellite system.

34 Claims, 8 Drawing Sheets

PREDISTORTED MODULATION SYSTEM FOR BANDWIDTH EFFICIENT SATELLITE LINKS

CROSS-REFERENCE TO RELATED APPLICATIONS

This application claims the benefit under 35 U.S.C. §119 (e) of the following co-pending and commonly-assigned U.S. patent application, which is incorporated by reference herein:

U.S. Provisional Patent Application No. 60/376,214, filed Apr. 29, 2002, by Susan Bach and Andrew Strodtbeck and entitled "PREDISTORTED MODULATION SYSTEM FOR BANDWIDTH EFFICIENT SATELLITE LINKS".

This application is related to the following co-pending and commonly-assigned U.S. patent applications, which are both incorporated by reference herein:

U.S. Provisional Application Serial No. 60/376,105, filed Apr. 29, 2002, by Charles F. Stirling, Bernard M. Gudaitis, William G. Connelly and Catherine C. Girardey, entitled "SECURE DATA CONTENT DELIVERY SYSTEM FOR MULTIMEDIA APPLICATIONS UTILIZING BANDWIDTH EFFICIENT MODULATION"; and U.S. Provisional Application Serial No. 60/376,244, filed Apr. 29, 2002, by Ismael Rodriguez and James C. Campanella, entitled "A METHOD TO SECURELY DISTRIBUTE LARGE DIGITAL VIDEO/DATA FILES WITH OPTIMUM SECURITY".

BACKGROUND OF THE INVENTION

1. Field of the Invention

The present invention relates to communication satellite systems. Particularly, this invention relates to systems and methods for bandwidth and power efficient techniques to enhance data throughput for communication satellite systems.

2. Description of the Related Art

Increasing data throughput for a given allocated bandwidth of a communication satellite translates directly into benefits for the satellite operator. These benefits can enhance end-to-end system capabilities for the government or civil customer for example, or increased revenue and market opportunities for a commercial service provider. Communication satellite systems have limited bandwidth and spacecraft power and both government and commercial operators need to maximize the system utility. Thus, there is a need for satellite systems that operate with enhanced data throughput.

Power and bandwidth are two precious commodities of a communication satellite system. Current satellite systems typically achieve approximately 1 to 1.5 bits-per-second-per-hertz (bps/Hz) bandwidth efficiencies using QPSK modulation; for systems with slightly more power to overcome the denser signaling format, one may achieve approximately 2 bps/Hz using 8PSK modulation. Because non-band-limited QPSK and 8PSK have equal power in each possible symbol, they are considered "constant-envelope" modulation schemes. This characteristic reduces the waveform's vulnerability to the nonlinear distortions inherent to power efficient, space-borne transmitters. Although band-limiting (also known as pulse shaping) eliminates the strict constant envelope characteristic, the band-limited waveforms remain quite robust to nonlinear distortions.

Transmission with higher bandwidth efficiency enables more data to be transmitted for a given spectral bandwidth. However, the penalty of constant envelope waveforms becomes untenable. Moreover, the more densely packed bandwidth-efficient constellations are more vulnerable to distortion effects. The impact is particularly significant for satellite links where nonlinear amplifiers are used to maximize the efficient utilization of on-board power. A prosaic approach might be to operate the spacecraft traveling wave tube amplifier (TWTA) in a backed off mode, several dB from its saturation point, and achieve more linear performance. However, this approach wastes spacecraft power, since the amplifier efficiency degrades significantly as it is backed off from saturation.

This invention describes a technique and implementation that intentionally corrupts ("predistorts") the high power amplifier input to create the desired signal at the amplifier output. Related digital modulators which utilize random access memory (RAM) based pre-distortion have been applied to similar link architectures. In this scheme, several consecutive symbols are used to address the RAM. The RAM contents contain digital representation of the desired predistorted waveform. However, while highly flexible, the RAM size for these other techniques becomes prohibitive for higher order modulations with band limiting or significant dispersive distortion. For example, analyses indicate that achieving 5 bits per second per Hertz of available bandwidth requires 64-ary modulation and a pre-distortion that considers 32 consecutive symbols. The device would need to provide two I and Q samples per symbol each with at least 6 bits of resolution. Thus the RAM would have 193 address bits (6 bits/symbol×32 symbols+1 bit for even/odd sample) and a width of 12 bits (I and Q at 6 bits each). Consequently, the necessary RAM would be $1.9 \times 10^{58}$ bytes. (To illustrate the infeasibility of the RAM based approach to such higher order modulations, this RAM would require the mass of approximately 3,500 suns using a hypothetical storage device requiring only a single silicon atom per bit of storage.)

Another approach for mitigating nonlinear distortions is to use on board radio frequency (RF) devices called linearizers to counteract the high power amplifier (HPA) nonlinearity. The cascade of a carefully tuned linearizer with the HPA creates the desired linear amplifier response. This analog approach, however, requires significant hardware on board the spacecraft (increasing size, weight and power consumption of the payload). In addition, it is extremely time-consuming and difficult to tune the extra hardware properly over temperature variations and other lifetime equipment variabilities. Consequently, this approach may not provide sufficient linearity to enable multi-amplitude signal transmission. Furthermore, frequency dependent variations in the HPA, linearizer, and associated RF components make this approach even more difficult for very wideband channels.

There is a need for systems and methods for improving the data throughput or bandwidth efficiency for satellite transmission systems without the aforementioned difficulties. The present invention meets these needs.

SUMMARY OF THE INVENTION

The present invention enables transmission of bandwidth efficient modulation formats capable of achieving approximately two to five times the per channel data throughput of current satellite systems with practical spacecraft power levels and hardware implementations.

Embodiments of the invention employ a digitally-implemented, self tuning technique to mitigate both linear and nonlinear distortions typical of a wideband satellite channel utilizing an HPA. The invention is applicable to very wideband channels (e.g., >1 GHz), distortion limited, direct satellite downlinks, as well as typical commercial, civil, and tactical transponded satellite channels. Further, the invention enables extremely power-efficient multi-amplitude signaling through a nonlinear HPA.

In contrast to the RAM-based digital modulators discussed above, the present approach utilizes algorithmic pre-distortion to-sidestep the RAM size by computing each value when it is needed rather than storing all possible required values. The present algorithmic pre-distortion architecture is motivated by the physical limitation of the related approach and has all flexibility required to mitigate distortions that occur in practice.

The invention provides channel distortion mitigation to enable a two-fold (or greater) increase in per-channel satellite capacity over the current state-of-the-art without sacrificing enormous amounts of spacecraft power and without requiring heroic analog HPA linearization efforts. This technology can enable information superiority and provide a key element of emerging system architectures. In commercial programs, the improved bandwidth efficiency enables higher throughputs and thus increased revenues. Moreover, the power efficient, bandwidth efficiency of the present invention allows conventional transponders and low cost terminals to achieve key threshold rates such as that of optical carrier standard, OC-3 (155 Mbps). In one notable exemplary application, the invention can be applied to a digital cinema program distribution cinema to enable efficient delivery of the high quality digital media via satellite, enabling current satellites and inexpensive receive terminals to complement the high capacity distribution afforded by terrestrial fiber-optic service.

A typical embodiment of the invention includes a predistortion processor for predistorting a digital data source signal to reduce transmission distortion and an adaptive algorithm processor for controlling the predistortion processor according to a received a feedback signal derived from the transmitted signal. The feedback signal can be derived at the transmitter output or via feedback messages from a receive location. In the former case, a common local oscillator can be used to provide a timing signal to both the modulator and demodulator. In the latter case, the feedback signal may be communicated to the adaptive algorithm processor via a low data rate return path, either through a satellite return link or via an alternative path such as a telephone line MODEM.

The predistortion processor can include linear and nonlinear processing. The linear processing can employ a zero forcing equalization (ZFE) algorithm implemented with an asymmetric finite impulse response digital filter (e.g., four independent real finite impulse response functions). Coefficients of the digital filter can be controlled by adaptive algorithm processor. The non-linear processing can include a complex gain multiplying the digital data source signal where the complex gain depends upon a monotonic function (e.g., power or voltage) of the transmitted data source signal. A lookup table can be used to quickly determine the proper complex gain. The lookup table (values) can be adjusted by the adaptive algorithm processor using a gradient technique.

A pulse shaping digital filter (e.g., a symmetric finite impulse response filter) can also be applied to the digital data source signal along with the predistortion processing. The filter can comprise two substantially identical real finite impulse response functions to achieve the desired degree of bandlimiting.

BRIEF DESCRIPTION OF THE DRAWINGS

Referring now to the drawings in which like reference numbers represent corresponding parts throughout.

DETAILED DESCRIPTION OF THE PREFERRED EMBODIMENT

Figure 1:
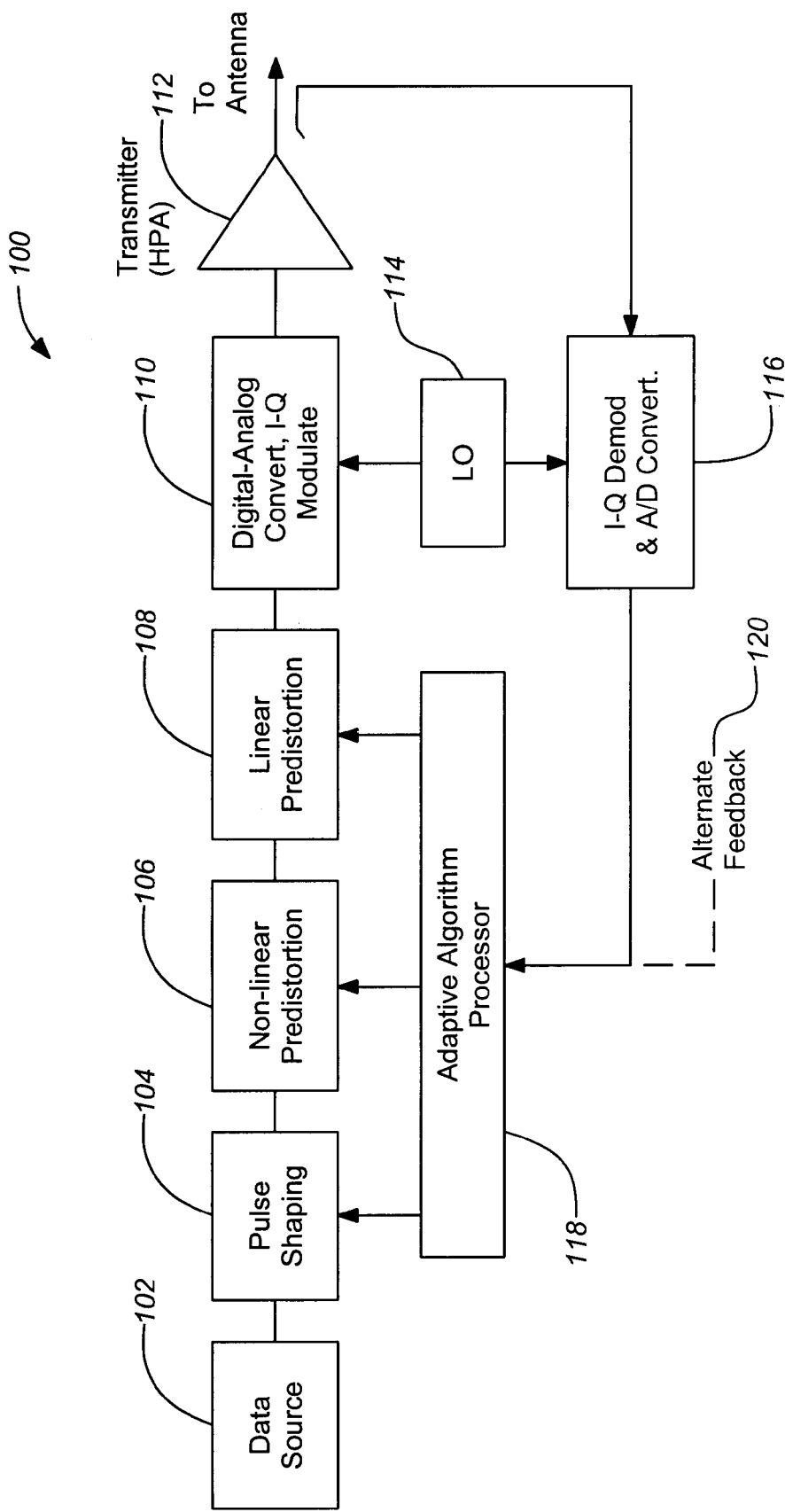
FIG. 1 is a block diagram of a typical signal processor embodiment of the invention.

In the following description of the preferred embodiment, reference is made to the accompanying drawings which form a part hereof, and in which is shown by way of illustration a specific embodiment in which the invention may be practiced. It is to be understood that other embodiments may be utilized and structural changes may be made without departing from the scope of the present invention.
1.0 Predistorted Modulation System FIG. 1 is an block diagram of a typical signal processor 100 embodiment of the invention. The signal processor 100 begins with a data source 102 that is communicated to a pulse shaping processor 104, a non-linear predistortion processor 106 and a linear predistortion processor 108. Each of these processors 104, 106, 108 are continuously adjusted by an adaptive algorithm processor 118 as will be described hereafter. The adaptive algorithm processor 118 operates based upon feedback on the distorted signal. Following the pulse shaping and predistortion processors 104, 106, 108, the signal then proceeds to a digital to analog converter (DAC) and in-/quadrature-(I-Q) phase modulator 110 where the signal is prepared for transmission. This output is then communicated to one or more high power amplifiers (HPAs) 112 before being transmitted from the antenna. As most distortion manifests in the HPAs 112, signal feedback to the adaptive algorithm processor 118 is tapped following the HPAs 112. The feedback signal is demodulated and digitized in the demodulator 116. A local oscillator (LO) 114 is used to provide timing to the modulator 110 of the transmitter as well as the demodulator 116 of the feedback loop.

The algorithmic pre-distortion concept cascades signal processing functions to mitigate distortion effects and thus, create a high fidelity replica of the desired waveform at the transmitter or transponder output. The individual processing functions are described below.

The pre-distortion functions are complementary to, and applied in the reverse order as the distortions inherent to the transmission system. Note that it is not necessary to compensate for the linear distortions (or dispersions) that occur after the HPA output non-linearity. These are not dominant and can be mitigated through fixed and/or adaptive receive equalizers.
1.1 Pulse Shaping And Linear Pre-Distortion The pulse shaping and linear pre-distortion processors 104, 108 can be implemented as finite impulse response (FIR) digital filters. The pulse shaping filter coefficients may be fixed or adjustable, and the linear pre-distortion coefficients are adaptively controlled. Typically, the pre-distortion filter will have an asymmetric frequency response and is implemented via four, independent, real FIR functions. The pulse shaping is typically a symmetric filtering operation and, thus, may be implemented with two identical real FIR filters.

1.2 Non-Linear Pre-Distortion

The non-linear pre-distortion processor 106 can be implemented as a complex gain that depends on the instantaneous signal magnitude. Magnitude can be measured as voltage, power, or any monotonic function of such measures. The instantaneous power of the incoming I-Q signal is measured (e.g., with the demodulator 116) and applied to a lookup table. The lookup table produces a complex gain that multiplies the incoming signal to produce the desired output. The adaptive algorithm processor 118 can adjust the lookup table contents to optimize the pre-distortion performance.

1.3 Output Measurement

Output measurement for feedback in one hop links can be accomplished by directly sampling the transmitter output from the HPAs 112. In this case, frequency and phase coherence are easily maintained, since the same local oscillator 114 is used for I-Q modulation and can be used for down-conversion of the feedback signal. In other embodiments as will be further discussed hereafter, e.g. two hop applications, the destination demodulator performs the measurement and relays the data back to the transmitter, such as through a low data rate return path. In this case, the demodulator 116 can be eliminated from the transmitter as the alternate feedback 120 is already down-converted by the distant receiver (not shown in FIG. 1).

1.4 Adaptive Control

Adaptive control can utilize a dosed-loop and/or dither optimization techniques. Previous work has emphasized such closed-loop schemes. For example, the linear pre-distortion function of the present invention can modify the zero forcing equalization (ZFE) algorithm to suit the needs of the system. (See e.g., John G. Proakis and Masoud Such, Communications Systems Engineering, Prentice Hall, Englewood Cliffs, N.J., 1994, section 8.4 for a description of classical ZFE which is incorporated by reference herein.) Referring to the equation below, a standard ZFE weight update algorithm may be written:

$$w_{k+1}^j = w_k^j (P_k Z_k) P_{k-j}^*$$

where subscripts denote time indices and superscripts denote tap indices. In embodiments of the present invention, the modified ZFE update is given by:

$$w_{k+1}^j = w_k^j + \Delta (P_k - Z_k) D_{k-j}^* - \alpha_j - c_k \beta_j$$

Where $\alpha_j$ and $\beta_j$ depend only on the pulse shape:

$$\alpha_{k-j} = \langle (D_k - P_k) D_{k-j}^* \rangle$$

$$\beta_k = \langle P_k D_{k-j}^* \rangle$$

(the angle brackets are the expectation operator) and $c_k$ is updated iteration using the equation:

$$c_k 1 g e^{j\phi}$$

with g and $\phi$ representing the gain and phase shift of the feedback path.

The nonlinear predistortion lookup table is adjusted using a simple gradient technique. Typical HPAs possess monotonic phase shift and output power as a function of input drive up to the saturation drive level. Because of this characteristic, the table entries can also be adjusted to maintain a monotonic characteristic. We can utilize the algorithm:

$$G_{k+1}(P_{Inst}) G_k(P_{Inst}) + \mu \operatorname{Re} \lfloor (P_k Z_k) P_k^* \rfloor$$

$$\Theta_{k+1}(P_{Inst})_k (P_{Inst}) + \mu \operatorname{Im} \lfloor (P_k - Z_k) P_k^* \rfloor$$

Computer modeling can be used to validate the technique for one-hop operations. RF equipment and full-rate A/D and D/A converters can be used to simulate practical applications. For example, a mock system can be operated at 660 million symbols/sec using 64 QAM operating at 5 bps/Hz applying the invention. A high power traveling wave tube amplifier (TWTA) with additional filters to simulate the dispersions of a high bandwidth system can be used.

2.0 Exemplary Method of the Invention

Figure 2A:
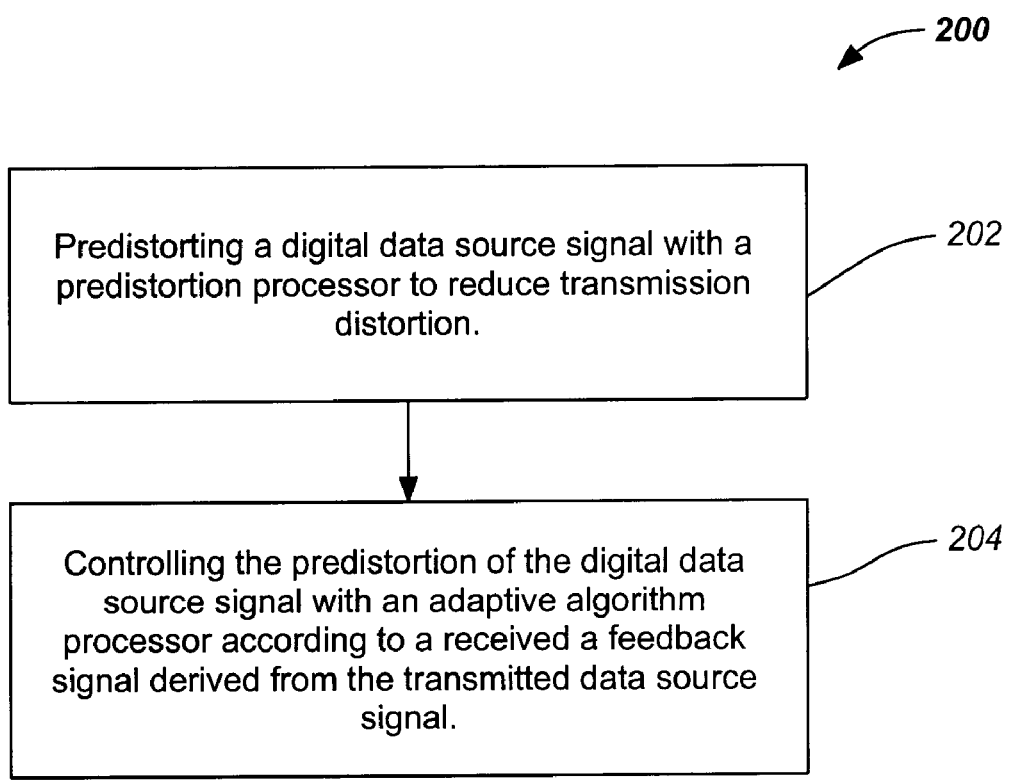
FIG. 2A is a flowchart of a typical method embodiment of the invention.

FIG. 2A is a flowchart of a typical method embodiment of the invention. The method 200 begins at block 202 where a digital data source signal is predistorted with a predistortion processor to reduce transmission distortion. At block 204, the predistortion of the digital data source signal is controlled with an adaptive algorithm processor according to a received a feedback signal derived from the transmitted data source signal. Predistortion processing can include linear and non-linear processing.

Figure 2B:
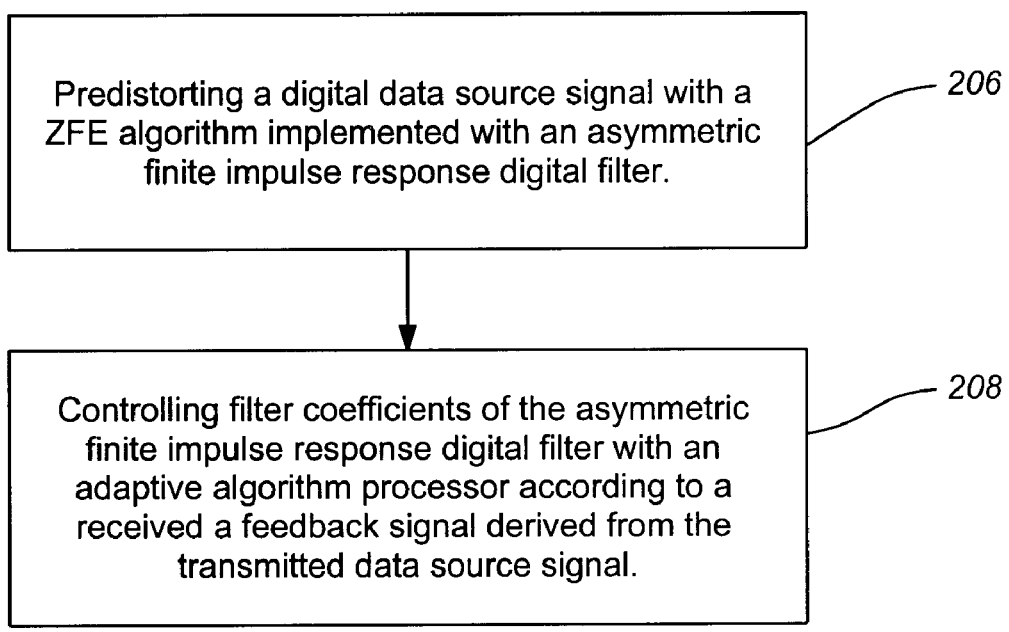
FIGS. 2B and 2C are submethods for linear and non-linear predistortion processing, respectively.
Figure 2C:
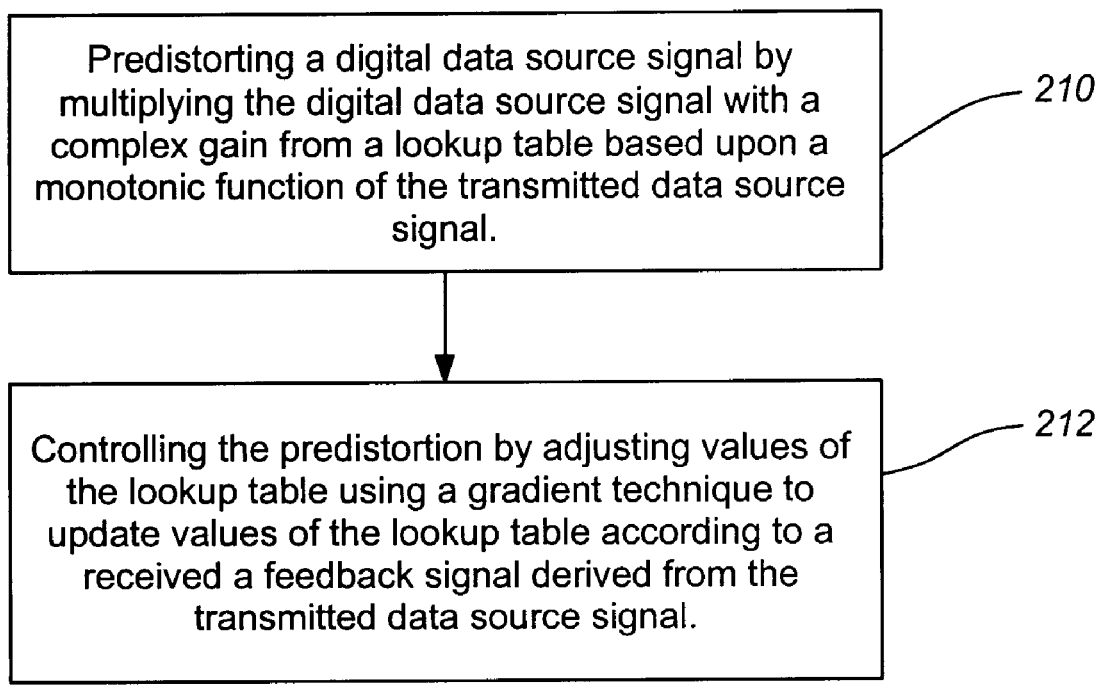

FIGS. 2B and 2C are flowcharts of the linear and non-linear predistortion subprocesses in a method embodiment of the invention, respectively. These predistortion subprocesses each include two steps which can be respectively included in the two steps, predistorting 202 and adaptive control 204, of the typical method embodiment 200 described above. The linear predistortion processing of FIG. 2B employs a ZFE algorithm implemented with an asymmetric finite impulse response digital filter (e.g., by four independent real finite impulse response functions) at block 206. The filter coefficients of the asymmetric finite impulse response digital filter can be adaptively controlled based upon the feedback signal at block 208. For non-linear processing as shown in FIG. 2C, a complex gain from a lookup table can be multiplied by the digital data source signal at block 208. The complex gain can be determined from a lookup table based upon a monotonic function of the transmitted data source signal. Further, the lookup table can be adjusted using a gradient technique to update values of the lookup table at block 210.

The feedback signal can be derived from the transmitted data source signal before transmission (e.g., in a one-hop implementation) or after transmission (e.g., in a two-hop implementation). In the former case, common local oscillators can be used to provide carrier and a timing signal for both the transmitter modulator and the demodulator for measuring the quality of the feedback signal. In the latter case, the feedback signal can be derived by a receiver of the transmitted data source signal and communicated to the adaptive algorithm processor via a low data rate return path, such as a back channel of a digital cinema system as described hereafter.

In further method embodiments of the invention, a pulse shaping digital filter can be applied to the digital data source signal, also controlled by the adaptive algorithm processor according to a received a feedback signal. As previously described, the pulse shaping digital filter can comprise a symmetric finite impulse response filter using two substantially identical real finite impulse response functions.

3.0 One Hop and Two Hop Systems

Figure 3A:
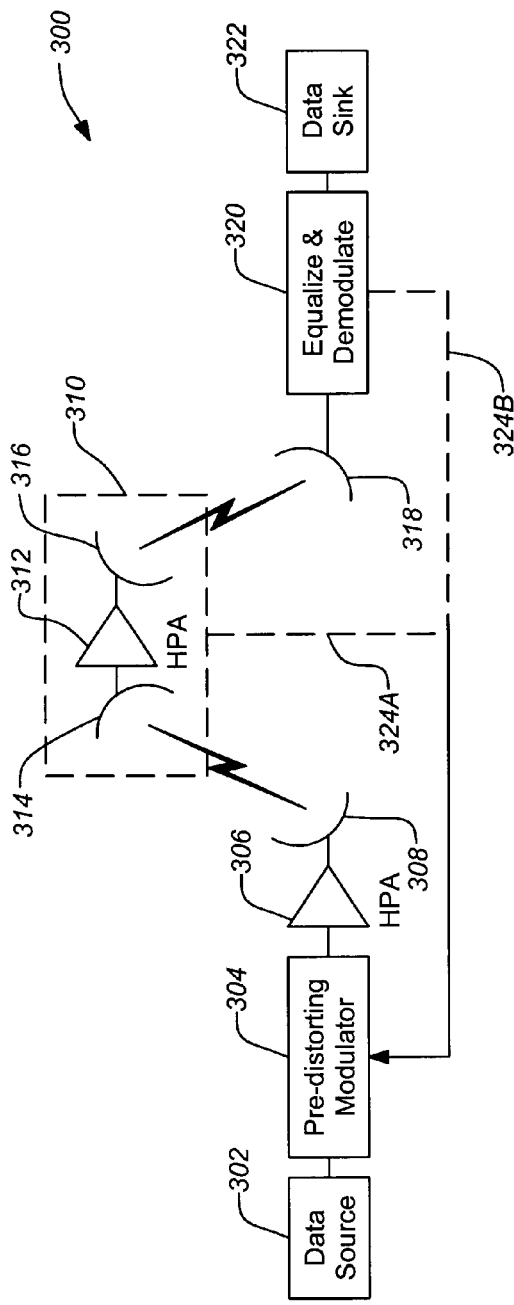
FIGS. 3A and 3B illustrate, respectively, a one hop and two hop implementation of the invention in a satellite system.
Figure 3B:
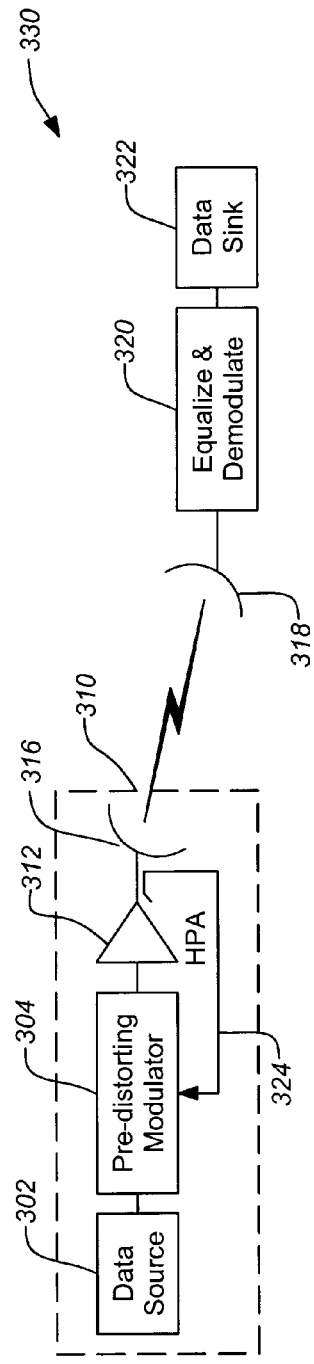

FIGS. 3A and 3B illustrate, respectively, a one hop and two hop implementation of the invention in a satellite system. In an exemplary one-hop application as shown in FIG. 3A, a transmitter in a direct satellite downlink from an on-board data source employs a high power amplifier that typically dominates the non-linear link distortions. In an exemplary two hop system as shown in FIG. 3B, both the transmitter and the transponder contribute significant non-linear distortions. In either case, embodiments of the present invention compare the known, desired signal with the distorted transmitted signal to adjust digitally implemented linear and non-linear pre-distortion. Additional adaptive receive equalization may also be employed in the system. Receive equalization cannot mitigate the non-linearities and dispersions that occur prior to non-linearities addressed by the adaptive pre-distortion scheme of the present invention.

The present invention is very practical, readily capable of 4 Gbps for 5 bps/Hz and 9.6 Gbps for 3 bps/Hz, both for single hop (downlink only) architectures. For one hop systems, a signal processing ASIC can be developed that will generate formats up to 8 bits per symbol at speeds up to 3 billion symbols per second when operated in a multiplexed mode. For two hop applications the approach can achieve bandwidth efficiencies greater than 3 bps/Hz in a standard commercial transponder (bent-pipe) system.

Embodiments of the invention can improve product performance and functionality of satellite communication links by enabling multi-amplitude signaling which enables greater bandwidth efficient modulation formats. Embodiments of the invention are practical for use in bent pipe transponder systems as well, requiring minor additional complexity to be added to the transmitter, but none to the spacecraft or end user receivers.

As previously discussed, in single-hop applications the invention enables demod/remod systems requiring very high speed downlink capabilities. In transponder system applications, the invention has application where revenue depends on per-channel throughput e.g., digital cinema distribution systems; or where successful implementation relies on bandwidth efficient transmission approximately 3 bps/Hz and higher. Details of an exemplary digital cinema system application are discussed hereafter. However, bent pipe applications are practically subject to certain system constraints. The uplink transmitter is also nonlinear and must be operated at lower average power levels to accommodate the signal expansion required for spacecraft HPA predistortion. Also, the bent-pipe system suffers from variation in the uplink path loss, additive noise on the uplink, and additional time delay required to obtain the spacecraft output signal feedback information.

4.0 Digital Cinema System Application

Figure 4A:
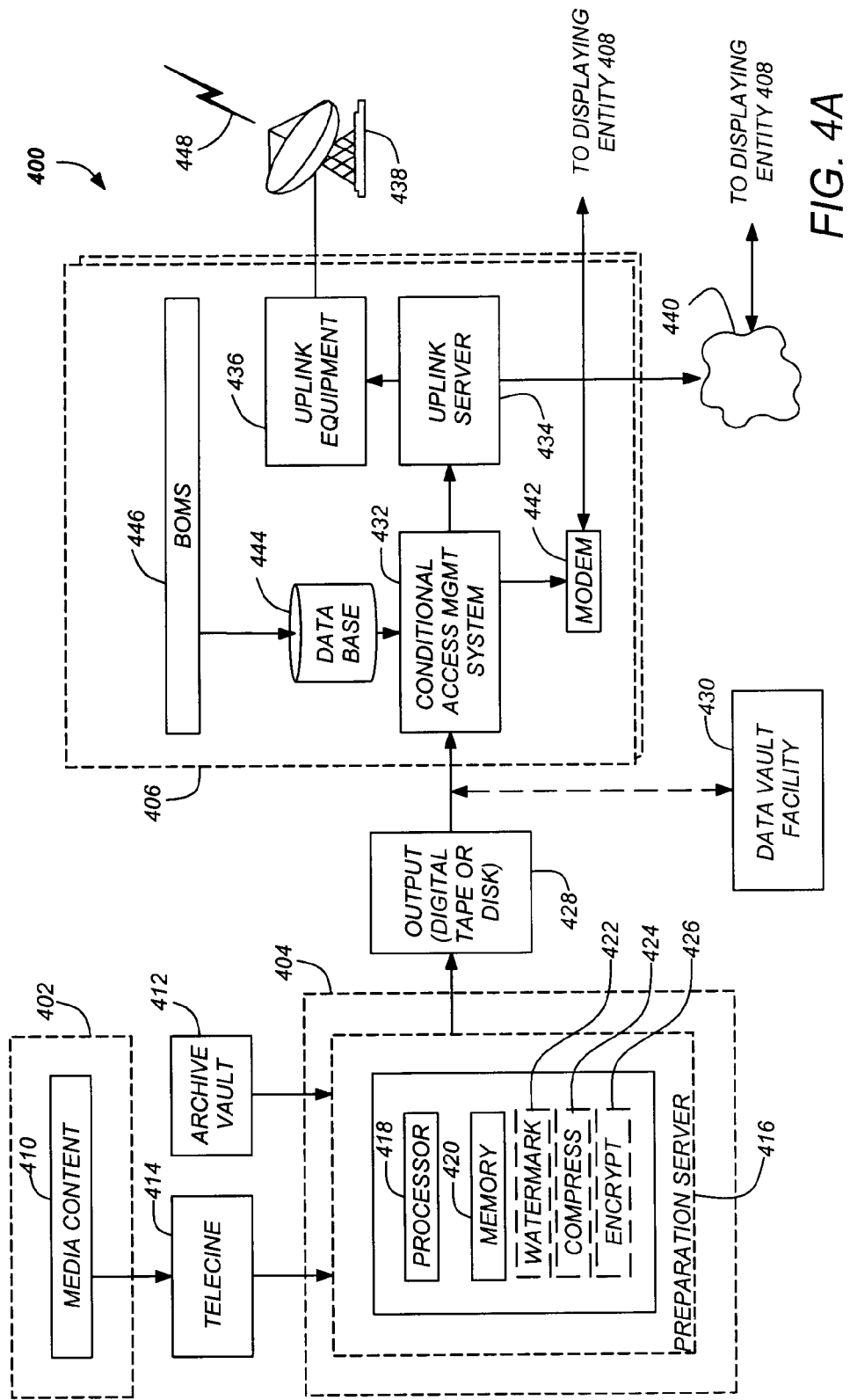
FIGS. 4A and 4B depict a top-level functional block diagram of one embodiment of a typical digital cinema program distribution system.
Figure 4B:
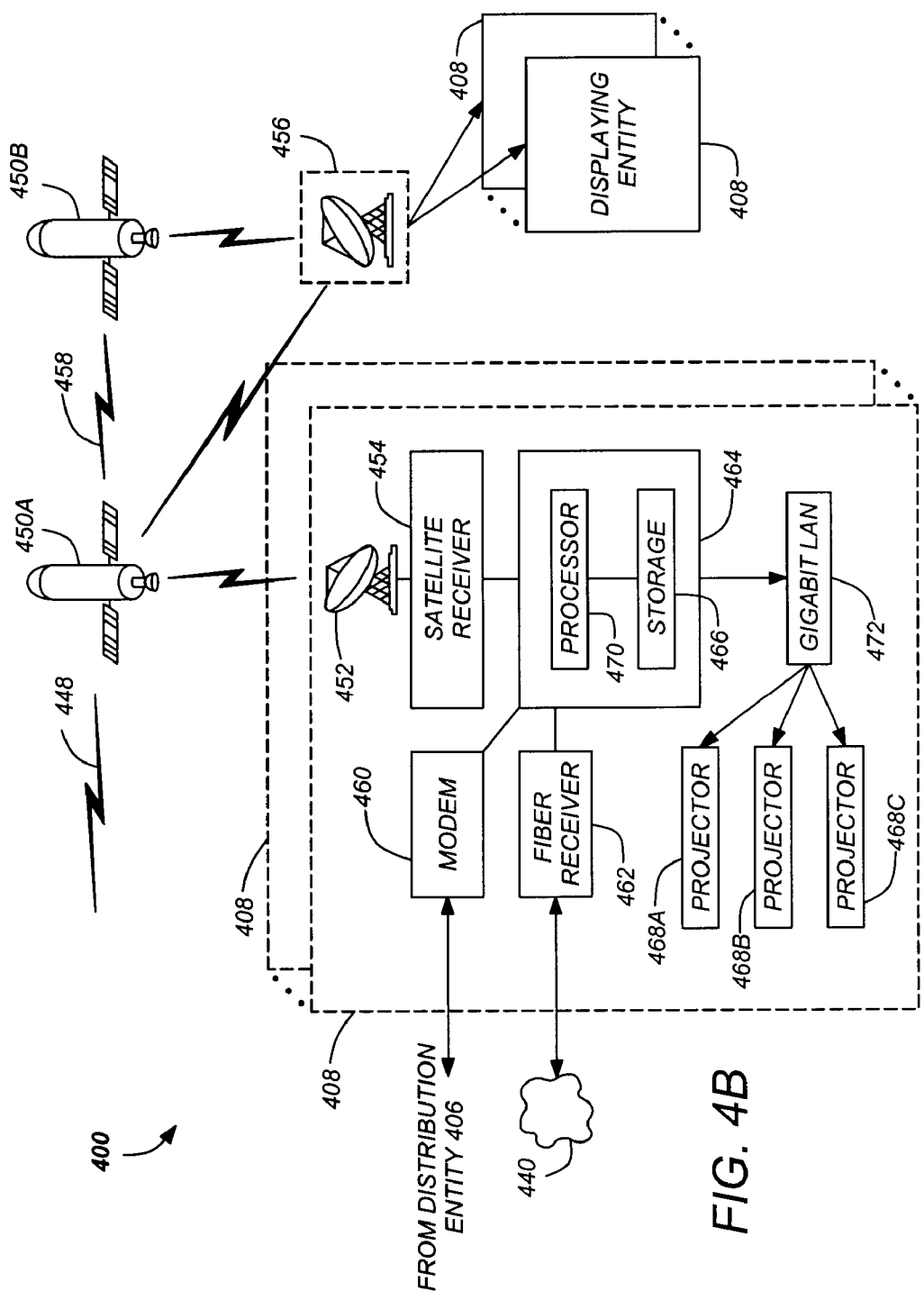

FIGS. 4A and 4B depict a top-level functional block diagram of one embodiment of a media program distribution system 400 which employs the foregoing predistortion technique. The media distribution system 400 comprises a content provider 402, a protection entity 404, a distribution entity 406 and one or more presentation/displaying entities 408. The content provider 402 provides media content 410 such as audiovisual material to the protection entity 404. The media content 410, which can be in digital or analog form, can be transmitted in electronic form via the Internet, by dedicated land line, broadcast, or by physical delivery of a physical embodiment of the media (e.g. a celluloid film strip, optical or magnetic disk/tape). Content can also be provided to the protection entity 404 (also referred to as a preparation entity) from a secure archive facility 412.

The media content 410 may be telecined by processor 414 to format the media program as desired. The telecine process can take place at the content provider 402, the protection entity 404, or a third party.

The protection entity 404 may include a media preparation processor 416. In one embodiment, the media preparation processor 416 includes a computer system such as a server, having a processor 418 and a memory 420 communicatively coupled thereto. The protection entity 404 further prepares the media content 410. Such preparation may include adding protection to the media content 410 to prevent piracy of the media content 410. For example, the preparation processor 416 can add watermarking 422 and/or encrypt 426 the media content 410 to protect it. In addition, the preparation processor can also apply compression 424 to the media content 410. Once prepared, the output media content 428 can be transferred to digital tape or a disk (e.g. a DVD, laserdisk, or similar medium). The output media content 428 can then be archived in a data vault facility 430 until it is needed.

When needed, the prepared output media content 428 is then provided to the distribution entity 406 (alternatively referred to hereinafter as the network operations center [NOC]). Although illustrated as separate entities, the protection entity 404 and the distribution entity 406 can be combined into a single entity, thus ameliorating some security concerns regarding the transmission of the output media content 428.

The distribution entity 406 includes a conditional access management system (CAMS) 432 (also referred to as a configuration management engine), that accepts the output media content 428, and determines whether access permissions are appropriate for the content 428. Further, CAMS 432 may be responsible for additional encrypting so that unauthorized access during transmission is prevented. Once the data is in the appropriate format and access permissions have been validated, CAMS 432 provides the output media content 428 to an uplink server 434, ultimately for transmission by uplink equipment 436 to one or more displaying entities 408 (also referred to as exhibitor systems) (shown in FIG. 4B). This is accomplished by the uplink equipment 436 and uplink antenna 438. Also, as shown, in addition or in the alternative to transmission via satellite, the media program can be provided to the displaying entity 408 via fiber network 440 in a forward channel. Additionally, information may be transmitted to displaying entity 408 via a modem 442 using, for example a public switched telephone network line. A land based communication such as through fiber network 440 or modem 442 is referred to as a back channel. Thus, information can be transmitted to and from the displaying entity 408 via the back channel or the satellite network. Typically, the back channel provides data communication for administration functions (e.g. billing, authorization, usage tracking, etc.), while the satellite network provides for transfer of the output media content 428 to the displaying entities 408.

All satellite transmissions in the media program distribution system 400 can be performed using uplink equipment 436 including the predistortion apparatus 100 previously described. The predistortion technique can be applied to satellite transmissions generally in a one-hop embodiment. In addition, it is particularly well suited to digital cinema applications in a two-hop embodiment because the displaying entities 408 are generally linked (e.g., via back channel of a fiber network 440) to the distribution entity 406 in a digital cinema system. Thus, the feedback signal 120 for the adaptive algorithm processor 118 can be communicated through this already established link.

The output media content 428 may be securely stored in a database 444. Data is transferred to and from the database 444 under the control and management of the business operations management system (BOMS) 446. Thus, the BOMS 446 manages the transmission of information to 408, and assures that unauthorized transmissions do not take place.

Turning to FIG. 4B, the data transmitted via uplink 448 is received in a satellite 450A, and transmitted to a downlink antenna 452, which is communicatively coupled to a satellite or downlink receiver 454.

In one embodiment, the satellite 450A also transmits the data to an alternate distribution entity 456 and/or to another satellite 450B via crosslink 458. Typically, satellite 450B services a different terrestrial region than satellite 450A, and transmits data to displaying entities 408 in other geographical locations.

A typical displaying entity 408 comprises a modem 460 (and may also include a fiber receiver 458) for receiving and transmitting information through the back channel (i.e., via a communication path other than that provided by the satellite system described above) to and from the distribution entity 406. For example, feedback information (e.g. relating to system diagnostics, billing, usage and other administrative functions) from the exhibitor 408 can be transmitted through the back channel to the distribution entity 406. The output media content 428 and other information may be accepted into a processing system 464 (also referred to as a content server) such as a server or computer similar to that which is illustrated in FIG. 2 (see description below). The output media content 428 may then be stored in the storage device 466 for later transmission to displaying systems (e.g., digital projectors) 468A–468C. Before storage, the output media content 428 can be decrypted to remove transmission encryption (e.g. any encryption applied by the CAMS 432), leaving the encryption applied by the preparation processor 418.

When the media content 410 is to be displayed, final decryption techniques are used on the output media content 428 to substantially reproduce the original media content 410 in a viewable form which is provided to one or more of the displaying systems 468A–468C. For example, encryption 426 and compression 424 applied by the preparation processor 416 is finally removed, however, any latent modification, undetectable to viewers (e.g., watermarking 422) is left intact. In one or more embodiments, a display processor 470 prevents storage of the decrypted media content in any media, whether in the storage device 466 or otherwise. In addition, the media content 410 can be communicated to the displaying systems 468A–468C over an independently encrypted connection, such as on a gigabit lan 472.

Figure 5:
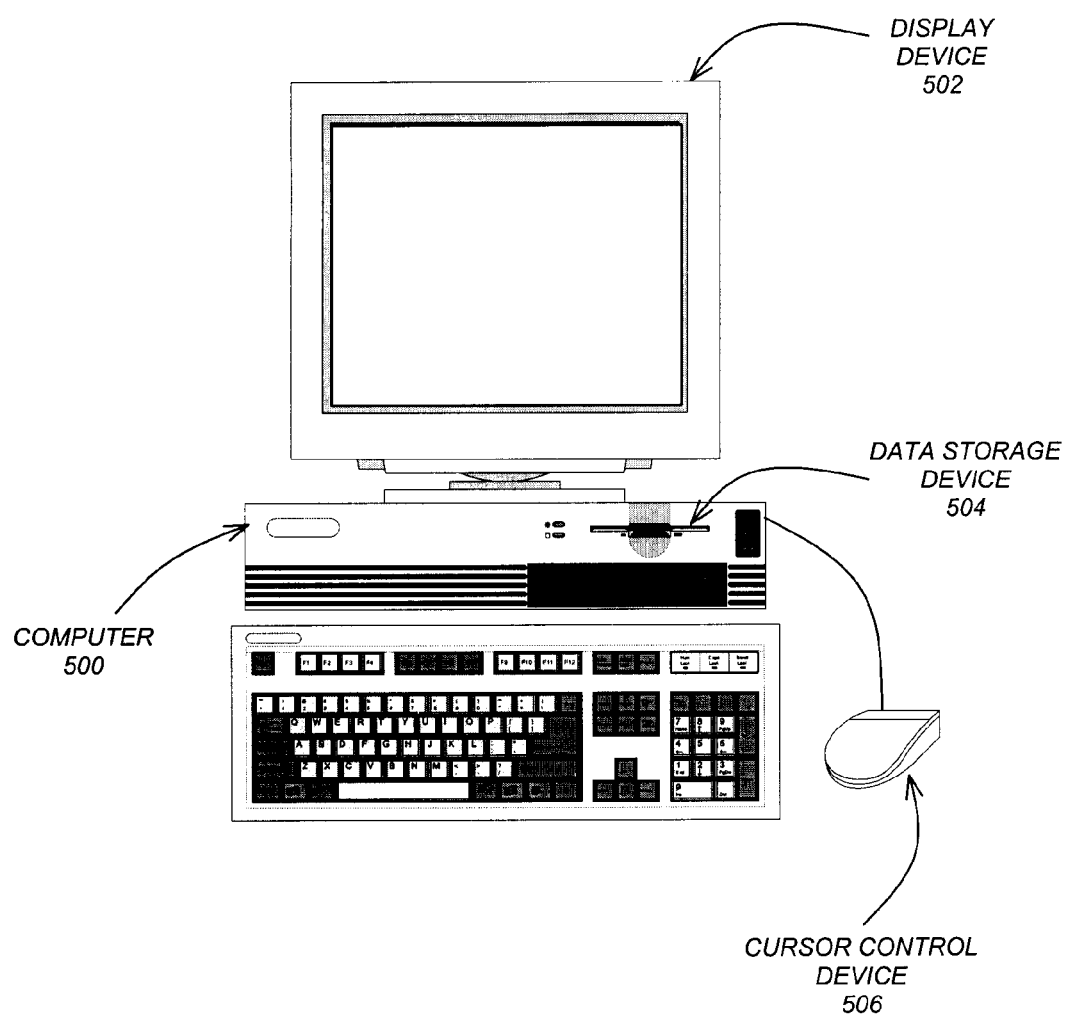
FIG. 5 is a functional block diagram of a computer system that can be used to perform the operations of the media preparation processor.

FIG. 5 is a functional block diagram of a computer system 500 that can be used to perform the operations of the media preparation processor 416 and processing system 464 at the exhibitor. Embodiments of the invention are typically implemented using a computer 500, which generally includes, inter alia, a display device 502, data storage devices 504, cursor control devices 506, and other devices. Those skilled in the art will recognize that any combination of the above components, or any number of different components, peripherals, and other devices, may be used with the computer 500.

Conclusion

This concludes the description including the preferred embodiments of the present invention. The foregoing description of the preferred embodiment of the invention has been presented for the purposes of illustration and description. It is not intended to be exhaustive or to limit the invention to the precise form disclosed. Many modifications and variations are possible in light of the above teaching.

What is claimed is:

1. An apparatus for transmitting signals, comprising:
   a predistortion processor for applying predistortion to a digital data source signal to reduce transmission distortion; and
   an adaptive algorithm processor for controlling the predistortion processor according to a received a feedback signal derived from the transmitted data source signal;
   wherein the predistortion processor includes a linear predistortion processor and the linear predistortion processor employs a zero forcing equalization (ZFE) algorithm.

2. The apparatus of claim 1, wherein the predistortion processor and adaptive algorithm processor operate in a digital cinema system.

3. The apparatus of claim 1, wherein the feedback signal is derived from the transmitted data source signal before transmission.

4. The apparatus of claim 1, wherein the feedback signal is derived from the transmitted data source signal after transmission.

5. The apparatus of claim 4, wherein the feedback signal is derived by a receiver of the transmitted data source signal and communicated to the adaptive algorithm processor via a low data rare return path.

6. The apparatus of claim 4, wherein the low data rare return path comprises a back channel of a digital cinema system.

7. The apparatus of claim 1, further comprising
   a modulator including a digital to analog converter for producing a transmission signal of the digital data source signal, and
   a high power amplifier for amplifying the transmission signal to produce the transmitted data source signal;
   wherein the transmission distortion comprises effects of the high power amplifier.

8. The apparatus of claim 7, further comprising:
   a demodulator including an analog to digital converter for producing the feedback signal derived from the transmitted data source signal; and
   a local oscillator providing a lining signal for both the demodulator and modulator.

9. The apparatus of claim 1, wherein the predistortion processor includes a non-linear processor.

10. The apparatus of claim 9, wherein the non-linear processor comprises a complex gain multiplying the digital data source signal, the complex gain depending upon an instantaneous magnitude of the data source signal.

11. The apparatus of claim 10, wherein the magnitude is a monotonic function of a power measurement and the power measurement is applied to a lookup table to determine the complex gain.

12. The apparatus of claim 11, wherein the adaptive algorithm processor adjusts the lookup table using a gradient technique to update values of the lookup table.

13. The apparatus of claim 1, wherein the linear processor comprises an asymmetric finite impulse response digital filter using filter coefficients controlled by the adaptive algorithm processor.

14. The apparatus of claim 13, wherein the asymmetric finite impulse response digital filter comprises four independent real finite impulse response functions.

15. The apparatus of claim 1, further comprising a pulse shaping digital filter applied to the digital data source signal.

16. The apparatus of claim 15, wherein the pulse shaping digital filter comprises a symmetric finite impulse response filter.

17. The apparatus of claim 16, wherein the symmetric finite impulse response filter comprises two substantially identical real finite impulse response functions.

18. A method of transmitting data, comprising the steps of:

applying predistortion to a digital data source signal with a predistortion processor to reduce transmission distortion; and controlling predistortion of the digital data source signal with an adaptive algorithm processor according to a received a feedback signal derived from the transmitted data source signal;

wherein the predistortion processor includes a linear predistortion processor and the linear predistortion processor employs a zero forcing equalization (ZFE) algorithm.

19. The method of the predistortion processor and adaptive algorithm processor operate in a digital cinema system.

20. The method of claim 18, wherein the feedback signal is derived from the transmitted data source signal before transmission.

21. The method of claim 18, wherein the feedback signal is derived from the transmitted data source signal after transmission.

22. The method of claim 21, wherein the feedback signal is derived by a receiver of the transmitted data source signal and communicated to the adaptive algorithm processor via a low data rate return path.

23. The method of claim 22, wherein the low data rate return path comprises a back channel of a digital cinema system.

24. The method of claim 18, further comprising:

producing a transmission signal of the digital data source signal with a modulator including a digital to analog converter; and amplifying the transmission signal with a high power amplifier to produce the transmitted data source signal;

wherein the transmission distortion comprises effects of the high power amplifier.

25. The method of claim 24, further comprising:

producing the feedback signal derived from the transmitted data source signal with a demodulator including an analog to digital converter; and providing a timing signal for both the demodulator and modulator with a local oscillator.

26. The method of claim 18, wherein the predistortion processor includes a non-linear processor.

27. The method of claim 26, wherein the non-linear processor comprises a complex gain multiplying the digital data source signal, the complex gain depending upon instantaneous magnitude of the data source signal.

28. The method of claim 27, wherein the magnitude is a monotonic function of a power measurement and the power measurement is applied to a lookup table to determine the complex gain.

29. The method of claim 28, wherein the adaptive algorithm processor adjusts the lookup table using a gradient technique to update values of the lookup table.

30. The method of claim 18, wherein the linear processor comprises an asymmetric finite impulse response digital filter using filter coefficients controlled by the adaptive algorithm processor.

31. The method of claim 30, wherein the asymmetric finite impulse response digital filter comprises four independent real finite impulse response functions.

32. The method of claim 18, further comprising a pulse shaping digital filter applied to the digital data source signal.

33. The method of claim 32, wherein the pulse shaping digital filter comprises a symmetric finite impulse response filter.

34. The method of claim 33, wherein the symmetric finite impulse response filter comprises two substantially identical real finite impulse response functions.

* * * * *